United States Patent [19]

Sims

[11] Patent Number: 5,239,823
[45] Date of Patent: Aug. 31, 1993

[54] MULTIPLE LAYER COOLED NOZZLE LINER

[75] Inventor: Robert E. Sims, Hobe Sound, Fla.

[73] Assignee: United Technologies Corporation, Hartford, Conn.

[21] Appl. No.: 661,354

[22] Filed: Feb. 26, 1991

[51] Int. Cl.⁵ ............................ F02K 1/00; B63H 25/46
[52] U.S. Cl. .......................................... 60/271; 60/752; 60/754; 239/265.17
[58] Field of Search .................. 60/266, 271, 752, 754, 60/755, 757; 239/132.5, 265.17

[56] References Cited

U.S. PATENT DOCUMENTS

| | | | |
|---|---|---|---|
| 3,349,558 | 10/1967 | Smith | 60/754 |
| 3,584,972 | 6/1971 | Bratkovich | 60/754 |
| 4,004,056 | 1/1977 | Carroll | 60/754 |
| 4,071,194 | 1/1978 | Eckert et al. | 60/755 |
| 4,168,348 | 9/1979 | Bhangu et al. | 60/754 |
| 4,422,300 | 12/1983 | Dierberger et al. | 60/754 |
| 4,628,694 | 12/1986 | Kelm et al. | 60/752 |

Primary Examiner—Richard A. Bertsch
Assistant Examiner—Howard R. Richman

[57] ABSTRACT

The present invention is a multiple layered nozzle liner for two-dimensional nozzles which provides both convective and film cooling, and incorporates a highly maintainable thermal barrier coating.

9 Claims, 3 Drawing Sheets

MULTIPLE LAYER COOLED NOZZLE LINER

TECHNICAL FIELD

The present invention relates to cooled liners, and particularly to such liners used in gas turbine engine exhaust nozzles.

BACKGROUND ART

In some applications, such as gas turbine engine exhaust nozzles, certain components must be protected from the high temperature exhaust to prevent life reduction or failure of those components. In two-dimensional exhaust nozzles in particular, a cooling liner is typically mounted to each wall of the nozzle to prevent direct contact between the exhaust and the wall. Cooling air fed to the "cool side" of the liner may provide impingement cooling, convective cooling, or film cooling to maintain the temperature of the liner below the maximum allowable operating temperature of the liner material. The "hot side", or exhaust side of such liners may additionally be coated with a thermal barrier material to impede heat transfer to the liner, thereby greatly increasing the effectiveness of the liner. These coatings generally wear away with time, requiring the liner to be recoated or replaced.

Liner designs of the prior art include liners made of LAMILLOY TM, a trademark of General Motors Corporation for a transpiration cooled liner material. One benefit of LAMILLOY TM is that it can be made of hard-to-form materials, such as mechanically alloyed iron based materials, which inherently provide high temperature durability. Liners made of LAMILLOY TM incorporate many small, straight, cooling air discharge holes which replenish the cooling film of the liner almost continuously. However, the straight cooling discharge hole configurations, to which LAMILLOY TM is limited, may not provide adequate cooling film effectiveness under certain nozzle operating conditions. Additionally, LAMILLOY TM cannot be coated effectively with thermal barrier material using current techniques, such as plasma (flame) spray coating, which tend to clog the discharge holes. Coating with a subsequent re-drilling of the holes has been tried with little success and high cost.

Other types of liners of the prior art incorporate concave discharge holes, or "bathtubs", formed into the hot side surface of the liner. Such liners are limited by manufacturing cost to "large bathtubs" and relatively large spacing therebetween. Although these liners provide effective film cooling under some conditions, the large spacing makes such liners susceptible to local cooling film migration induced by the exhaust local pressure gradients, which, in turn, reduces the local cooling effectiveness of the liner. In addition, the cost effective manufacture of these liners requires the use of very ductile materials.

What is needed is a nozzle cooling liner that is simple to manufacture, can be effectively coated with thermal barrier material, which replenishes the cooling film so often that it is less susceptible to local cooling film migration than the prior art, which gives the designer a wider choice of materials to use, and which allows optimization of both the hot side and cold side cooling.

DISCLOSURE OF THE INVENTION

It is therefore an object of the present invention to provide a nozzle cooling liner that is simple to manufacture, can be effectively coated with thermal barrier material, which replenishes the cooling film so often that it is less susceptible to local cooling film migration than the prior art, which gives the designer a wider choice of materials to use, and which allows optimization of both the hot side and cold side cooling.

According to the present invention, a multiple layered cooled nozzle liner is disclosed which comprises a composite panel made of multiple sheets of a high temperature material. The cool side of the liner is a sheet having a plurality of inlet holes extending therethrough, and the hot side is a sheet having a plurality of substantially larger discharge holes extending therethrough. The total flow area of the discharge holes is substantially greater than the total flow area of the inlet holes, resulting in a relatively low discharge velocity of cooling air from the discharge holes which, in turn, provides highly effective film cooling.

Sandwiched between the cool side sheet and the hot side sheet is at least one interior sheet. The inlet holes are offset with respect to the discharge holes, and internal flow channel holes in the interior sheet connect each inlet hole with at least one of the discharge holes. The internal flow channel holes provide convective heat transfer from the liner to the cooling air prior to the discharge thereof, allow impingement of the cooling air upon the back side of the hot sheet, and reduce the velocity of the cooling air before it is discharged.

The hot side sheet is preferably secured to the interior and cool side sheets by mechanical fasteners which allow the hot side sheet to be easily separated from the others without damage to the individual sheets. The hot side sheet can thus be coated with a thermal barrier material using current techniques without clogging the discharge holes. As the coating wears away, the hot side sheet can be recoated without damaging the liner of the present invention, resulting in a highly maintainable nozzle liner.

The foregoing and other features and advantages of the present invention will become more apparent from the following description and accompanying drawings.

BEST MODE FOR CARRYING OUT THE INVENTION

Figure 1:
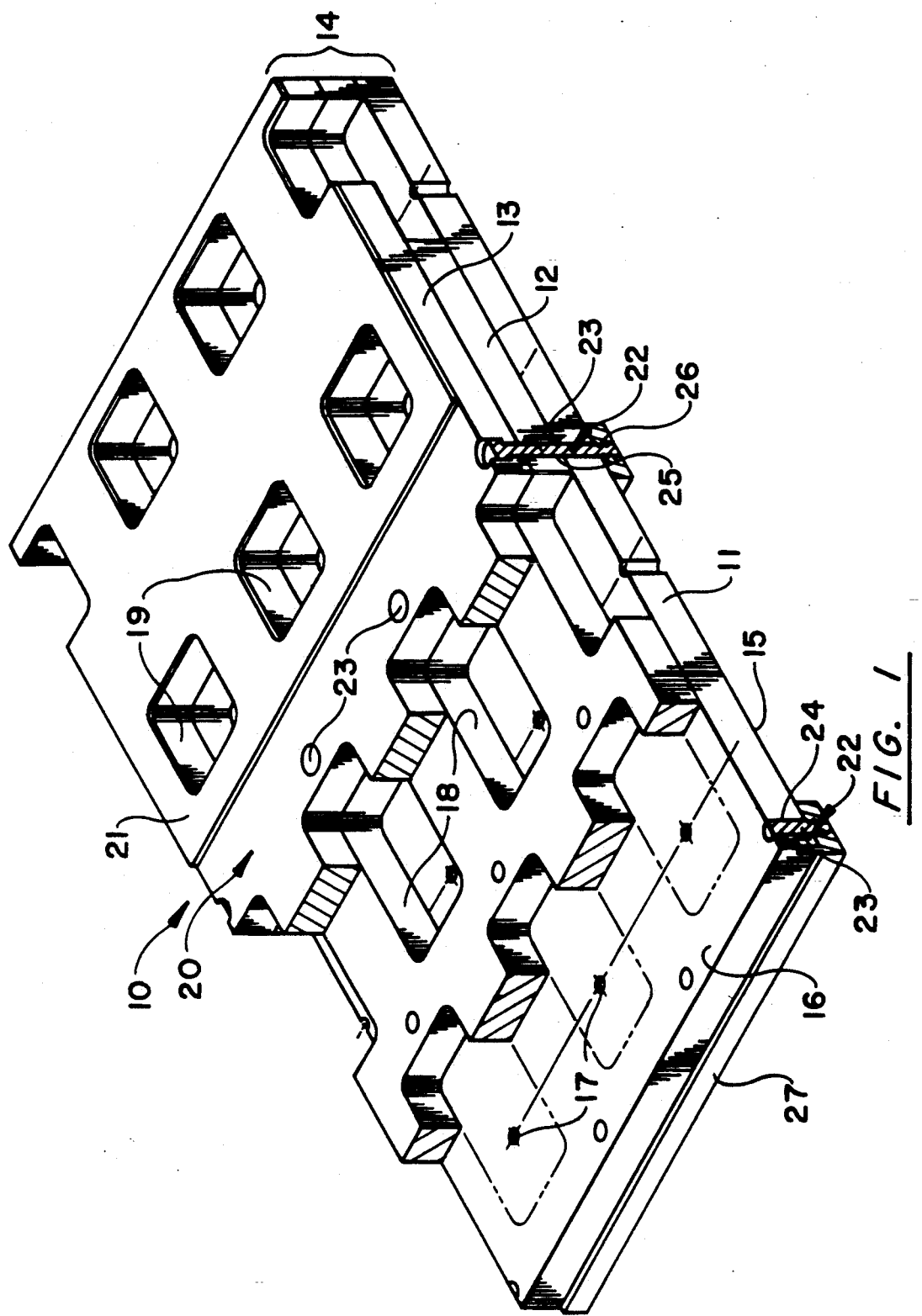
FIG. 1 shows a partially cut-away view of the preferred embodiment of the present invention.

FIG. 1 shows a partially cut-away view of the preferred embodiment of the liner (10) of the present invention. The liner preferably comprises three sheets (11,12,13) secured together in a manner discussed below to form a single composite panel (14). The first, or cold side, sheet (11), has first and second surfaces (15, 16), the first surface (15) being generally exposed to the fluid used to cool the liner (10). A plurality of inlet holes (17) extend between the first and second surfaces (15,16) to provide for the passage of the cooling fluid into the liner (10). Sandwiched between the first and third sheets (11,13) is the second, or interior, sheet (12). The interior sheet (12) has a plurality of internal flow channel holes (18) extending therethrough between the first and third sheets (11,13). The internal flow channel holes (18), which form cooling air passages within the liner (10), are discussed in greater detail below. The interior sheet (12) may be bonded to the cool side sheet (11) if desired, by brazing or other suitable means. The third, or hot side, sheet (13) includes a plurality of closely spaced discharge holes (19) arranged in a pattern similar to the pattern of the internal flow channel holes (18) in the interior sheet (12). The discharge holes (19) are significantly larger than the inlet holes (17), for reasons discussed further below. The outer surface (20) of the third sheet (13) is preferably coated with a thermal barrier coating to impede heat transfer from the exhaust gas to the liner (10).

The hot side sheet (13) is removably secured to the cool side sheet (11) by a plurality of fasteners (22). Each fastener (22) preferably includes a plurality of pins (23) which may be brazed or otherwise attached to the hot side sheet (13). Each pin (23) extends from the hot side sheet (13) through bores (24,25) in the cool side and interior sheets (11,12). A groove end portion (26) of each pin (23) extends beyond the cool side sheet (11) where it is engaged by a locking strip (27) that prevents the pin (23) from retracting into the bore (24) of the cool side sheet (11). Although the present invention is shown and described with respect to a specific type of fastener (22), it is to be understood that such fastener (22) is exemplary only and is not intended to limit the scope of the claims.

In use, coolant such as cooling air, is supplied to the first surface (15) of the cool side sheet (11) at a pressure significantly greater than that of the exhaust. The cooling air accelerates through the inlet holes (17) and exits into an internal flow channel hole (18) of the interior sheet (12) as a high velocity jet. This jet impinges the inner surface of the hot side sheet (13), producing turbulent heat transfer therebetween and significantly reducing the velocity of the cooling flow. The cooling air then flows toward a discharge hole (19) in the hot side sheet (13). As those skilled in the art will readily appreciate, the significant difference in flow area between the discharge holes (19) and the inlet holes (17) results in discharge of the cooling air into the exhaust at low velocity, thereby providing effective film cooling of the liner (10) downstream of the discharge holes (19). This effective film cooling is particularly useful if the coating is temperature limited.

Since the present invention is comprised of sheet material, substantially any material which can be formed into sheets could conceivably be used to form the composite panel (14). Therefore, high temperature materials, such as mechanically alloyed iron based materials which, although difficult to form in complex shapes are relatively easy to manufacture in sheet form, may be used to form the composite panel (14). Known manufacturing processes, such as chemical or photo etching, may be used to produce the holes (17,18,19,24,25) in the various sheets, requiring only minimal machining of the sheet material.

Figure 2:
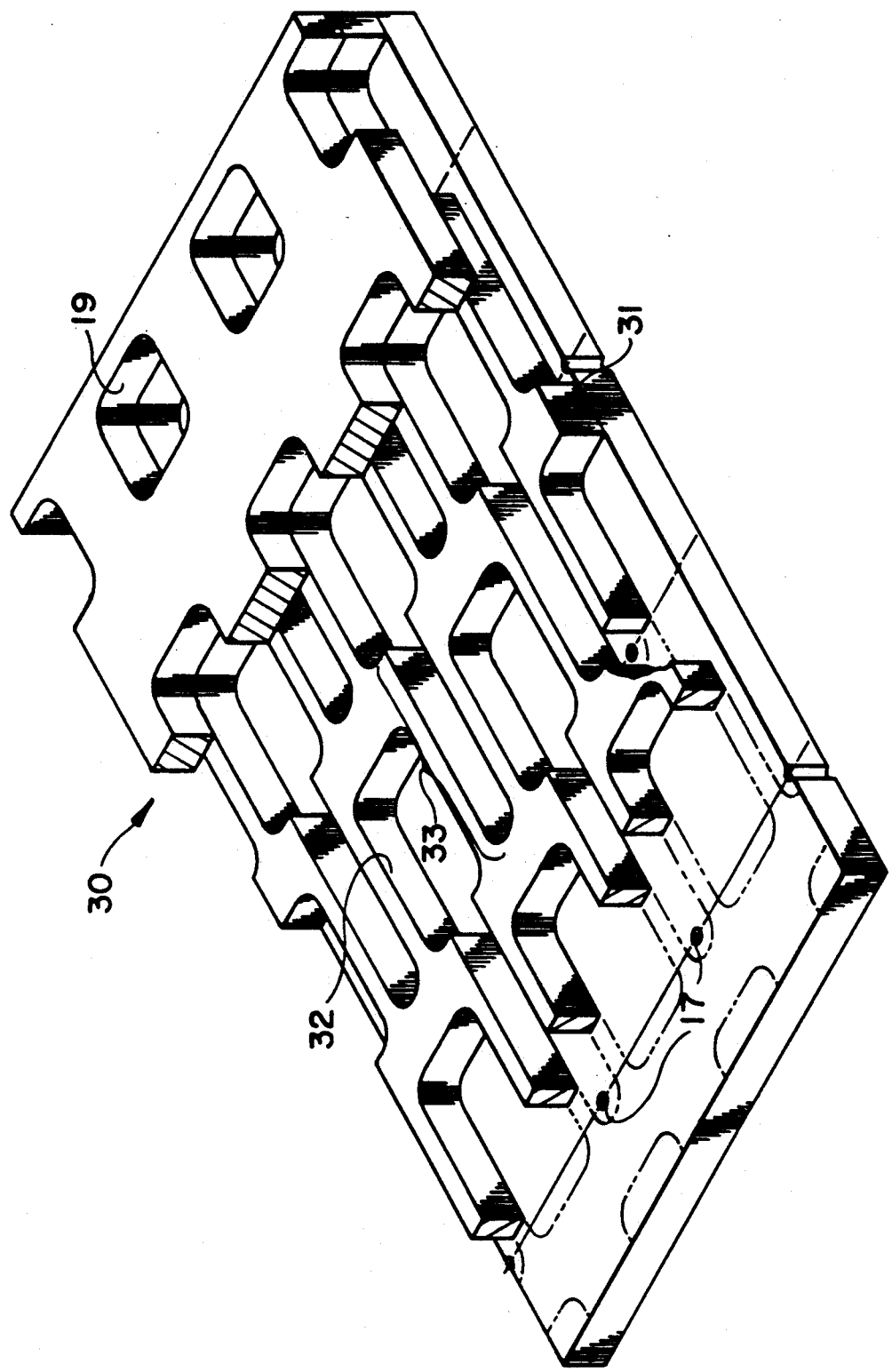
FIG. 2 shows a partially cut-away view of a second embodiment of the present invention.

A second embodiment (30) of the present invention utilizes an interior sheet having "keyhole" shaped internal flow channel holes (32), as shown in FIG. 2. In this embodiment, a portion (33) of the internal flow channel hole (32) is elongated, increasing the heat transfer area between the cooling air and the liner (30), thereby enhancing convective heat transfer. As those skilled in the art will readily appreciate, heat transfer may be further enhanced in the elongated portion (33) by providing a tortuous cooling air flow path therein (e.g. inserting turbulators into the elongated portion (33), providing a zig-zag cooling air flow path in the elongated portion (33), etc.).

Figure 3:
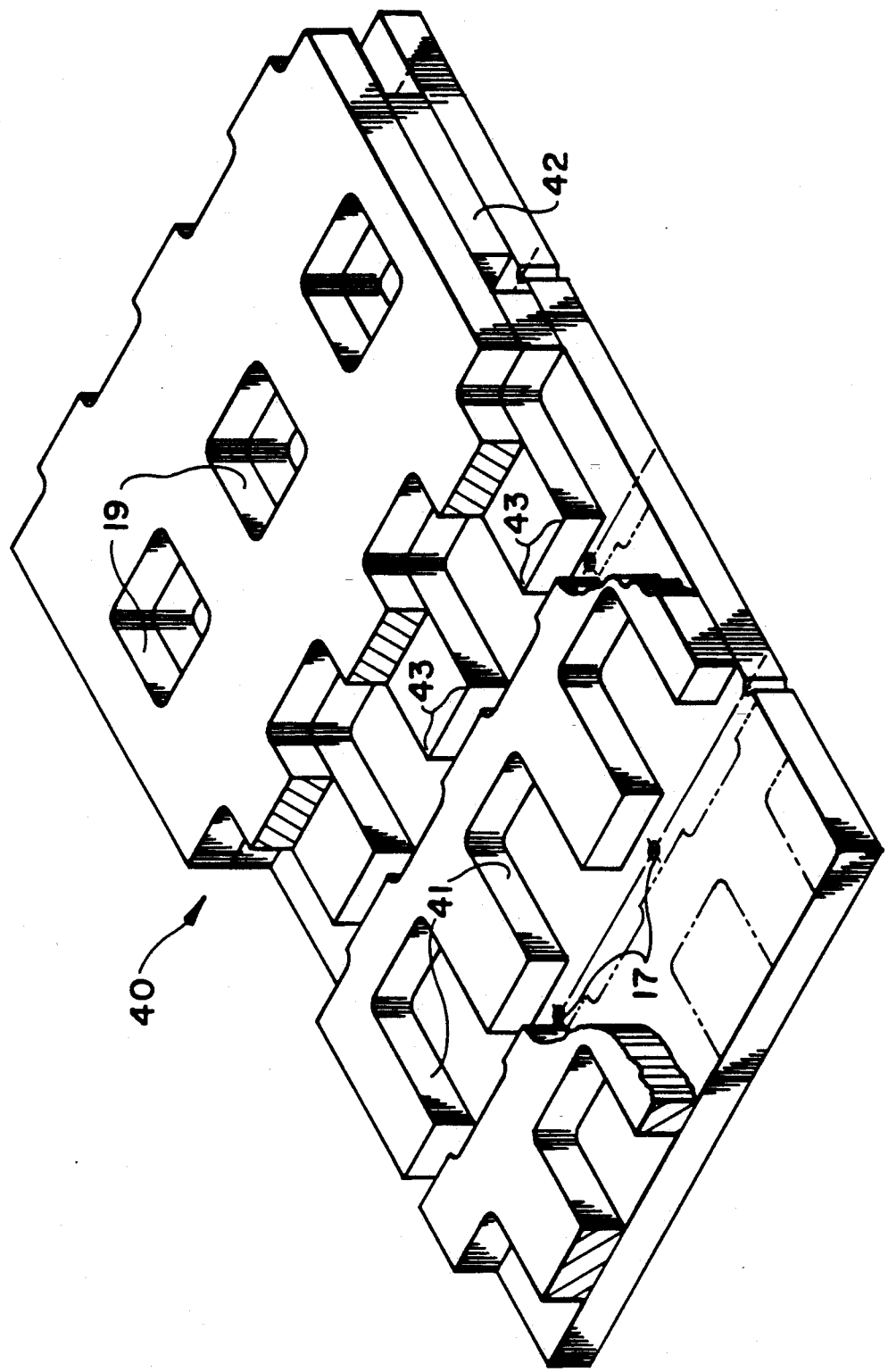
FIG. 3 shows a partially cut-away view of a third embodiment of the present invention.

The third embodiment (40) of the present invention, shown in FIG. 3, provides for transverse flow of the cooling air through internal flow channel holes (41) which are interconnected within the interior sheet (42) by the elongated portions (43). In this embodiment, cooling air flow from adjacent inlet holes (17) collide within the intervening internal flow channel holes (41), producing turbulent cooling air flow within the internal flow channel hole (41) and enhancing heat transfer between the liner (40) and the cooling air. Additionally, since each inlet hole (17) communicates with several discharge holes (19) within the liner (40), should a blockage of a single inlet hole (17) occur, a discharge hole (19) would not necessarily be deprived of all cooling air, as might occur in the embodiments of FIGS. 1 and 2. It is to be understood that the second and third embodiments (30,40) of the present invention include the fasteners and thermal barrier coating disclosed in the description of the preferred embodiment (10) shown in FIG. 1. For purposes of clarity, the fasteners and thermal barrier coating are not shown in FIGS. 2 and 3.

Although the present invention is shown and described in terms of a three sheet composite panel (14), variations on the basic configurations described herein will be obvious to those skilled in the art. For example, the internal flow channel holes (12,32,41) of the interior sheet (12,31,42) could be etched into the inner surface of either the cool side sheet (11), the hot side sheet (13), or both, thereby obviating the need for the interior sheet (12,31,42).

The present invention takes advantage of the inherently good convection cooling associated with multiple, small passages within the cooling liner (10,30,40) and the inherent superior film effectiveness of shaped, low discharge velocity holes (19). It combines the ability to manufacture multiple thin sheets, machined or etched (chemically or photo) with very close inlet and discharge hole (17,19) spacing with almost infinite tailoring (size, shape and spacing of inlet holes (17), discharge holes (19), internal flow channel holes (18,32,33,41,43) etc.) and the ability to use hard-to-form materials. In addition, the liner (10,30,40) of the present invention can be coated and recoated using the plasma (flame) spray process without clogging the internal flow channel holes of the liner (10,30,40). The result is a low cost, durable liner (10,30,40) that replenishes the cooling film almost continuously and is therefore less subject to cooling film migration than some prior art liners.

I claim:

1. A fluid cooled nozzle liner to protect one or more components of an exhaust nozzle from exhaust of a gas turbine engine, said liner comprising:

a first sheet having a plurality of inlet holes extending therethrough;

a second sheet secured to the first sheet and including a plurality of internal flow channel holes extending therethrough; and, a third sheet secured to the second sheet and including a plurality of discharge holes extending therethrough, an outer surface facing the exhaust, and a thermal barrier coating on the outer surface to impede heat transfer from the exhaust to the third sheet;

wherein each of the inlet holes communicates with at least one of the discharge holes through one of the internal flow channel holes, each discharge hole is substantially larger than each inlet hole in communication therewith and each discharge hole is substantially smaller than the internal flow channel hole in communication therewith.

2. The liner of claim 1 wherein the discharge holes of the third sheet are offset from the inlet holes of the first sheet so that fluid flowing from the inlet hole impinges the third sheet prior to flowing out of the discharge hole.

3. The liner of claim 2 wherein the third sheet is removably secured to the second sheet by a plurality fasteners sandwiching the second sheet between the first and third sheets.

4. The liner of claim 1 wherein each internal flow channel hole includes an elongated portion connected to at least one of the inlet holes, the elongated portion communicating with at least one of the discharge holes.

5. The liner of claim 4 wherein the discharge holes are offset from each elongated portion in communication therewith.

6. The liner of claim 5 wherein the third sheet is removably secured to the second sheet by a plurality fasteners sandwiching the second sheet between the first and third sheets.

7. A fluid cooled nozzle liner to protect one or more components from exhaust of a gas turbine engine, said liner comprising:
   a plurality of sheets forming a composite panel;
   coolant inlet means including a plurality of inlet holes in a first surface of the composite panel extending through at least one sheet, each inlet hole having an inlet flow area;
   a plurality of closely spaced discharge holes in a second surface of the composite panel extending through at least one sheet, each discharge hole having a discharge flow area; and,
   a plurality of channels between the first and second surfaces, each channel communicating with the coolant inlet means and at least one of the discharge holes; wherein the total flow area of the discharge holes is substantially greater than the total flow area of the inlet holes resulting in a relatively low discharge velocity of coolant from the discharge holes.

8. The liner of claim 7 wherein each of the channels includes an elongated portion connected to at least one inlet hole in communication therewith.

9. The liner of claim 8 wherein sheets are removably secured together by a plurality of fasteners.

* * * * *